(12) United States Patent
Wanke et al.

(10) Patent No.: US 9,004,803 B2
(45) Date of Patent: Apr. 14, 2015

(54) HEADREST SOCKET FOR ACCOMMODATING A HEADREST ROD

(75) Inventors: Jürgen Wanke, Nürnberg (DE); Herbert Boehm, Pollenfeld (DE)

(73) Assignee: Faurecia Autositze GmbH, Stradthagen (DE)

( * ) Notice: Subject to any disclaimer, the term of this patent is extended or adjusted under 35 U.S.C. 154(b) by 245 days.

(21) Appl. No.: 13/045,295

(22) Filed: Mar. 10, 2011

(65) Prior Publication Data

US 2012/0148342 A1 Jun. 14, 2012

(30) Foreign Application Priority Data

Mar. 10, 2010 (DE) .......................... 10 2010 010 978

(51) Int. Cl.
*B60N 2/48* (2006.01)

(52) U.S. Cl.
CPC ....... *B60N 2/4808* (2013.01); *B60N 2002/4897* (2013.01)

(58) Field of Classification Search
USPC ............ 297/463.1, 463.2, 390; 403/361, 325, 403/322.1, 329
See application file for complete search history.

(56) References Cited

U.S. PATENT DOCUMENTS

| | | | | |
|---|---|---|---|---|
| 3,498,672 A * | 3/1970 | Leichtl | .......................... | 297/410 |
| 3,512,833 A * | 5/1970 | Sugiura | .......................... | 297/410 |
| 3,542,429 A * | 11/1970 | Inoue et al. | .................... | 297/410 |
| 3,563,602 A * | 2/1971 | Ohta et al. | ..................... | 297/410 |
| 3,563,603 A * | 2/1971 | D'Aprile et al. | .............. | 297/410 |
| 3,567,282 A * | 3/1971 | Motokuni et al. | ............. | 297/410 |
| 3,572,834 A * | 3/1971 | Herzer et al. | .................. | 297/410 |
| 4,604,777 A | 8/1986 | Meeks | | |
| 4,854,642 A * | 8/1989 | Vidwans et al. | .............. | 297/410 |
| 5,056,867 A * | 10/1991 | Foster et al. | ................... | 297/410 |
| 5,529,379 A * | 6/1996 | Stocker | ......................... | 297/410 |
| 5,788,250 A * | 8/1998 | Masters et al. | ................ | 297/410 |
| 5,860,703 A * | 1/1999 | Courtois et al. | .............. | 297/410 |
| 6,682,143 B2 * | 1/2004 | Amirault et al. | ........... | 297/250.1 |
| 6,802,565 B2 * | 10/2004 | Isaacson | ....................... | 297/410 |
| 6,874,854 B2 * | 4/2005 | Terrand et al. | ................ | 297/410 |
| 7,108,327 B2 * | 9/2006 | Locke et al. | ................... | 297/410 |
| 7,159,946 B2 * | 1/2007 | Gurtatowski et al. | ......... | 297/410 |
| 7,338,130 B2 * | 3/2008 | Daume | ......................... | 297/410 |
| 7,429,086 B2 * | 9/2008 | Gans | .......................... | 297/463.1 |
| 7,434,886 B2 * | 10/2008 | Yamada | ........................ | 297/410 |
| 7,506,936 B2 * | 3/2009 | Saberan | ........................ | 297/410 |
| 8,075,060 B2 * | 12/2011 | Gans | .............................. | 297/410 |
| 2005/0077772 A1 * | 4/2005 | Yamada | ........................ | 297/410 |
| 2006/0012225 A1 | 1/2006 | Gans | | |
| 2006/0061188 A1 * | 3/2006 | Locke et al. | .................. | 297/410 |

* cited by examiner

*Primary Examiner* — Daniel P Stodola
*Assistant Examiner* — Daniel Wiley
(74) *Attorney, Agent, or Firm* — Jennifer S. Stachniak; Robert W. Becker

(57) ABSTRACT

A headrest socket for accommodating a headrest rod, including a socket body of polymeric material that has an inner space for accommodating a headrest rod. A spring tongue is provided as part of the socket body, or is monolithically formed on the socket body, and is displaceable toward the inner space for exerting a clamping effect. A spring device is disposed on the socket body for applying a tensioning or pressure action upon the spring tongue. The spring device is configured from a sheet steel strip.

15 Claims, 10 Drawing Sheets

HEADREST SOCKET FOR ACCOMMODATING A HEADREST ROD

The instant application should be granted the priority date of Mar. 10, 2010 the filing date of the corresponding German patent application 10 2010 010 978.9.

BACKGROUND OF THE INVENTION

The present invention relates to a headrest socket for accommodating a headrest rod.

A headrest socket is described in DE 20 2004 009 769 U1. The headrest socket is inserted into the upper region of the backrest, and serves to accommodate a headrest rod, which is introduced from above into the headrest socket in which it is received by means of a clamping or spring effect.

To accomplish this, DE 20 2004 009 769 U1 proposes to provide the headrest socket with an essentially tubular socket body made of plastic in which integrally formed on the socket body is a deflectable spring tongue that serves to rest and form the clamping action against the headrest rod. The spring action is provided by an additional, round wire member that extends parallel to the longitudinal axis of the socket body along the outer surface thereof, where it is clamped in by a hook portion of the socket body. The free ends of the wire element serve to provide the spring effect, whereby one free end presses against the spring tongue to thereby provide the necessary tensioning effect for clamping in the headrest rod.

Thus, the socket body can be economically produced with the important components being made of plastic, and with the spring effect being provided by the additional wire element, which is introduced into two hook portions, for example in the longitudinal direction. In this connection, the wire element is economical to produce, for example by being cut to length from an endless phase.

The spring effect is thus essentially determined by the diameter and material of the wire, the conditions of the clamping of the wire element by means of the hook portion, as well as the length of the wire element or the free ends thereof that are provided. The spring tongue and the hook portion of the socket body are essentially spaced apart from one another in the longitudinal direction.

However, where different installation conditions exist, such an arrangement can be problematic. Although, for example, the thickness of the wire element can be increased, nonetheless in conformity therewith different wire materials are required to produce different headrest -models. Further problems include in part the configuration of the spring shackle as a wall portion that can be displaced inwardly relative to the longitudinal axis of the socket body, and the elongated mounting of the wire with a longitudinal extension to the spring tongue and a hook receiving means that is spaced thereto in the longitudinal direction.

It is an object of the present invention to provide a headrest socket for accommodating a headrest rod that enables a flexible adaptation to the installation space conditions at low manufacturing costs or low manufacturing expenditure.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1A:
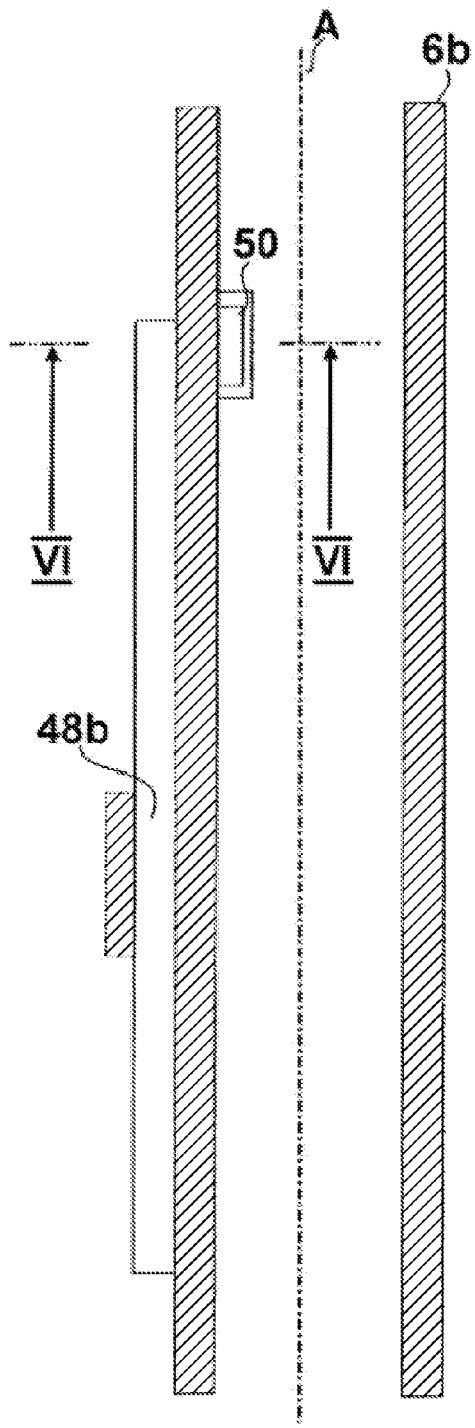
FIGS. 1a & 1b show a longitudinal section and a side view of a headrest socket pursuant to a first exemplary embodiment.

The headrest socket of the present application comprises a socket body of polymeric material, the socket body having an inner space for accommodating a headrest rod; a spring tongue provided as part of the socket body, or monolithically formed on the socket body, with the spring tongue being displaceable in a direction toward the inner space for exerting a clamping effect; and a spring device disposed on the socket body for applying a tensioning or pressure action upon the spring tongue, wherein the spring device is configured as a sheet metal or plate spring fashioned from a sheet steel strip.

Thus, pursuant to the present invention the spring effect is provided by a sheet metal or plate spring that is configured from a sheet steel strip. Pursuant to one embodiment, the plate spring can rest against the outer surface of the socket body and can be secured mechanically; pursuant to a further development, the plate spring can be injected, or sealed or fused into the polymeric material of the socket body.

The plate spring can, for example, be merely rectangular or can be contoured and/or bent along its extension in order to make desired spring characteristics and dimensions possible.

Underlying the present invention is the recognition that sheet metal plates can be obtained as standard products in different thicknesses and widths and, just like wire, can also be obtained as endless or continuous goods. However, in contrast to a wire element, lower cost differences result with sheet metal plates, since the price for parts is essentially determined by the material price of the raw material, in this case generally steel. A spring plate can thus have fundamentally the same material cost as does a correspondingly heavy wire element.

However, a plate spring can be dimensioned and contoured more freely than can a wire element, which is fixed by its round diameter and can only have different lengths. In particular, plate springs having different characteristics, for example different lengths and widths, and thus already different spring constants, can be formed from a uniform starting sheet, for which purpose it is merely necessary to set the cut in the trimming implement.

In particular due to the variable configuration of the width, i.e. the extension or dimension in the circumferential or transverse direction on the socket body, the desired spring effect can already be realized merely by the geometry of the plate spring, without additional changes being necessary on the socket body itself. Thus, a great variability can already be achieved merely with different dimensioning of the plate spring.

The moment of bending resistance, the pretension or biasing, and the spring characteristic can thus be standardized more easily and precisely pursuant to the present invention than is possible with a wire, the single parameter of which with respect to setting the bending resistance is its diameter.

Furthermore, a plurality of other characteristics can be achieved by means of suitable contouring, i.e. profiling or shaping, again by a simple adjustment of the trimming implement.

Pursuant to a further embodiment of the present invention, the plate spring, for example also in addition to a contouring, can be deformed, especially bent, for example radially inwardly relative to the central longitudinal axis of the socket body, in order to provide desired pretensioning and/or spring characteristics. The deformation can, for example, be effected by creases or bends.

By means of a suitable dimensioning, a superimposition of a number of spring characteristics can also be provided, for example by means of a wider spring portion, e.g. by the plate spring itself and a following spring portion, or a spring portion that is formed as part of the plate spring, having a lesser width, and/or deformation. Such a more complex configuration of the spring effects can also be realized in a relatively straightforward manner by means of a suitable cutting or trimming of the metal plate, and hence by means of the trimming implement.

Furthermore, a mechanical fixation of a plate spring on the socket body or the guide sleeve (headrest socket) is also simplified, since further geometrical means for providing a degree of freedom, such as, for example, recessed areas, release means and cutouts, can be provided in the plate spring, by means of which the plate spring is secured to the socket body of the guide sleeve, for example by receiving a shaped part, an insert, or an engagement portion of the socket body.

Thus, in contrast to a wire element, which is essentially secured by resting upon the outer surface of the socket body and being clamped in by means of hook sections that extend around it, pursuant to the present invention a significantly freer configuration is made possible.

Pursuant to the present invention, application of torque about the longitudinal axis of the socket body is furthermore also possible; this is in particular not possible with a linear wire element. To accomplish such torque, the plate spring can, for example, exert such a spring effect that by means thereof a twisting or rotation about its longitudinal axis, in other words relative to the longitudinal axis of the guide sleeve, is provided, as a result of which together with the clamping of the plate spring on the guide sleeve, the application or exertion of a torque is possible. For example, for this purpose the free end of the plate spring can have a non symmetrical configuration in the transverse direction, and, for example with its left or right region, can press against the correspondingly configured spring tongue, so that consequently the rotation relative to the longitudinal axis is achieved.

The spring tongue is preferably provided in a recess or aperture of the wall region of the socket body as a displaceable portion.

In particular the provision of torque is advantageous with regard to the required position of the spring tongue. Where more complex installation space conditions exist, it is possible that the spring tongue cannot be provided in the same longitudinal axis as the securement for the spring, so that it would not be possible, for example, to use a linear wire element.

Thus, pursuant to the present invention it is in principle possible to provide any desired spring force and torque; it is furthermore also possible to provide suitable securement, even under more difficult or complex installation space conditions, whereby fundamentally it is merely necessary to provide one suitable cut or trim and possibly a deformation of the plate spring, whereby the trim and possibly also the deformation can also be achieved with merely a single stroke of a trimming or shearing implement.

Furthermore, the plate spring itself can be supported against the outer receiving means. In this connection, the receiving means is inserted in the rest or support frame, or is also formed by the rest or support frame (rest or support structure). Thus, pursuant to the present invention this receiving means is formed, for example, by a part of the rest structure itself, and makes possible the suitable support. The plate spring then needs only to be presecured to the headrest guide or socket, i.e. its socket body, itself. The actual support of the support spring is then effected after assembly of the headrest guide into the receiving means, since the plate spring is automatically supported on the receiving means, and furthermore rests against the socket body of the headrest guide. In contrast to the use, for example, of a linear wire element, such an inventive configuration has the considerable advantage that receiving means, which use installation space or limit installation space, and that are provided on the guide sleeve for the mounting of the wire element itself, are no longer required, since it can itself be supported on the receiving means of the headrest guide or its socket body.

Pursuant to one inventive embodiment, the plate spring is injected or extruded and fused in the wall of the socket body.

For this purpose, the plate spring is advantageously injected during the injection molding of the socket body. Thus, the spring device is placed into the injection molding machine, or its mold, and the socket body, is then injected from polymeric material, whereby the spring device is injected along therewith.

The plate spring is preferably disposed on the outer surface of the socket body. Thus, during the manufacture the plate spring rests against the inner wall of the injection molding machine; the polymeric material is subsequently injected in and on its outer surface receives the plate spring. Thus, the inner surface of the plate spring rests against polymeric material; furthermore, its narrow edges are advantageously received in the polymeric material, resulting in a positive or form-fitting connection. In principle, the outer surface could also be covered with polymeric material, so that the plate spring is then accommodated entirely in the socket body. Complementarily, a positive material connection is preferably achieved between the inner surface of the plate spring and the polymeric material by the injection molding process.

The plate spring is thus reliably accommodated in the socket body in a non-detachable manner. The plate spring thus advantageously forms a part of the wall. In this connection, the overall thickness of the wall in the region of the plate spring can be the same as in the adjoining regions.

By means of the molding or injecting in of the plate spring, a reliable accommodation, with little handling effort, and hence low manufacturing costs, is possible. In particular, no manual threading-in of the spring into hook receivers or similar means on the outer surface of the socket body is any longer required; such means can also be easily damaged. The inventive configuration is also sturdy and reliable. The plate spring leads to a reinforcement of the wall.

The plate spring can extend even into the spring tongue, and thus, due to the high rigidity of the sheet metal material, determines the tensioning or pressure effect upon the spring tongue. If an abutment region of the spring tongue is provided, for example as an inwardly curved portion, the plate spring can extend, for example, up to this curved portion.

Pursuant to the present invention, it would be possible to provide, for example, two spring tongues and two plate springs, which could, for example, be disposed at diametrically opposite positions and/or can be spaced axially apart. The two plate springs can respectively extend to the spring tongues from, as viewed in an axial direction, a central portion, i.e. an upper plate spring extends upwardly from an axially central portion of the socket body into the region of the spring tongue, and in conformity therewith, the other, or lower, plate spring proceeds from the central portion axially downwardly up to the region of the lower spring tongue.

Further specific features of the present application will be described in detail subsequently.

DESCRIPTION OF SPECIFIC EMBODIMENTS

Referring now to the drawings in detail, in the illustrated embodiments the same or similar features are identified with the same or similar reference numerals.

Figure 7:
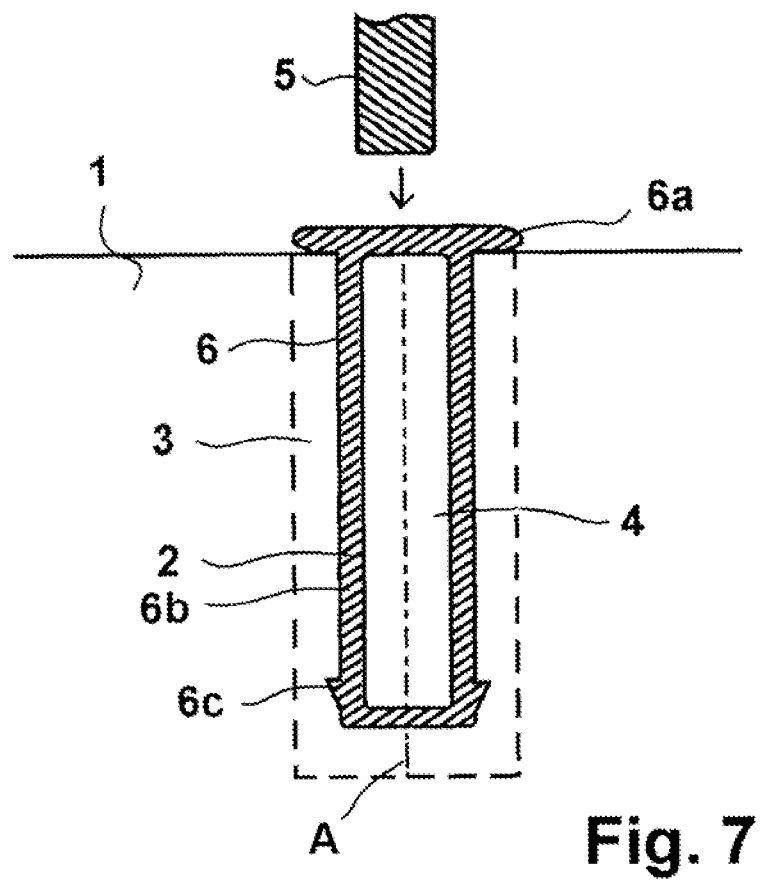
FIG. 7 illustrates the arrangement of the headrest socket in a receiving means of the backrest, as well as the accommodation of the headrest rod in the headrest socket.
Figure 8:
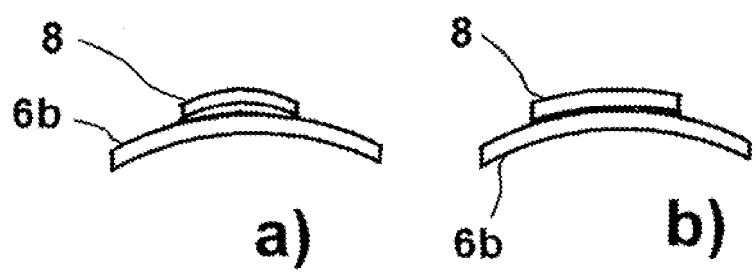
FIG. 8 is a bottom view of the plate spring of FIGS. 1 to 7 at a) greater curvature in the plate spring in the transverse direction, and b) with the plate spring resting upon the socket portion.

Pursuant to the overall illustration of FIG. 7, a receiving means 3 is formed in a rest or support structure of a backrest 1 of a vehicle seat, with the backrest 1 not being described in any greater detail. The receiving means 3 can be formed by an inserted tube or by the frame of the rest or the rest structure itself. A headrest socket 2 is inserted into the receiving means 3. The purpose of the headrest socket 2 is to accommodate, in its inner space 4, a headrest rod or post 5 that is inserted from above, as indicated by the arrow in FIG. 7, and that is to be clamped in or secured by means of spring action. In the highly schematic illustration of FIG. 7, the inventive provision of the spring action of the headrest socket 2 cannot be recognized.

The headrest socket 2 has a socket body 6 of polymeric material, and includes an upper or head portion 6*a* having a wider cross-section for a defined positioning when the receiving means 3 is inserted, and further includes a socket portion 6*b* that is to be inserted into the receiving means 3. The socket portion 6*b*, for example at its lower end, in other words opposite the head portion 6*a*, can be provided with barbs or similar arresting means 6*c* for catching or engaging in the receiving means 3.

FIGS. 1 to 12 show various exemplary embodiments accompanied in each case by the illustration of the socket portion 6*b*, or a part of the socket portion 6*b*, which is shown in cross-hatching. In this connection, the same or similarly designated components are identical or similar, in particular essentially identical or functionally comparable.

Figure 1B:
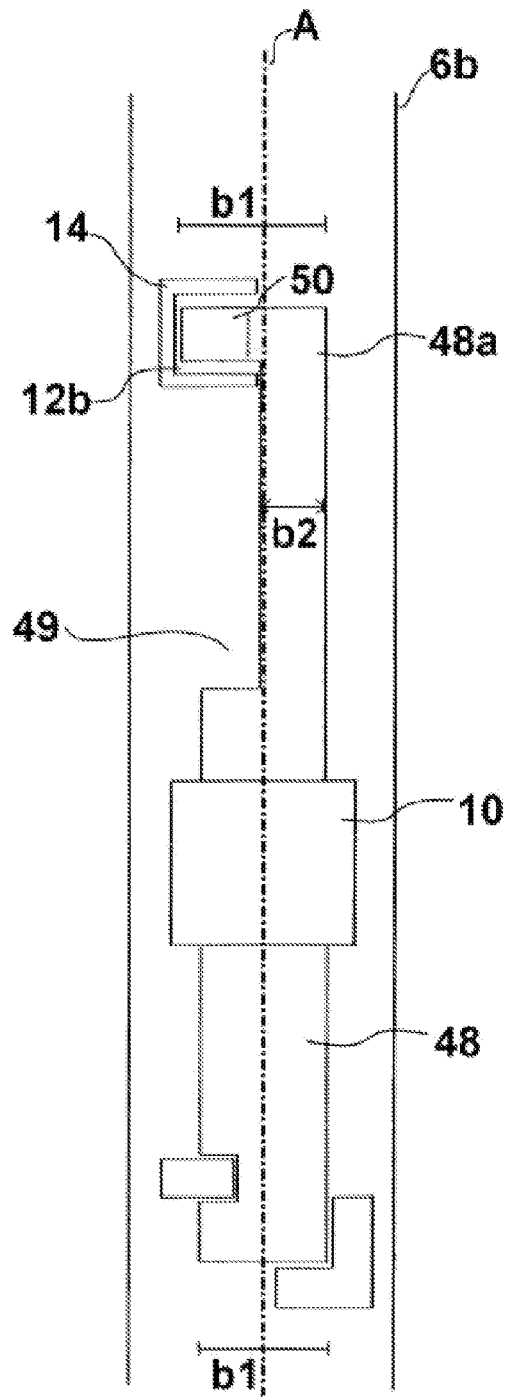

Pursuant to the embodiment of FIG. 1, a sheet metal or plate spring 8 rests against the outer surface of the socket portion 6*b*; the plate spring 8 extends essentially parallel to the longitudinal axis A of the essentially tubular socket portion 6*b*. A hook or catching portion 10 is monolithically formed with the socket portion 6*b*, or as a part thereof; the catching portion 10 can, for example, be formed directly during the formation of the tubular body of the socket portion 6*b*, or can subsequently be sprayed or injected thereon. The catching portion 10 extends radially outwardly from the tubular body of the socket portion 6*b*, and engages the central portion 8*b* of the plate spring 8 on the outer surface thereof, thereby preferably clamping the plate spring 8 in. Thus, the plate spring 8 is held in a radially outward direction, and is preferably also held in the longitudinal or axial direction by means of the clamping effect. The plate spring 8 is accordingly inserted in the longitudinal direction into an intermediate space 10*a* between the catching portion 10 and the socket portion 6*b*, which is indicated by the dashed-line arrow.

The socket portion 6*b* is provided with a spring tongue 12 around which extends a recessed area 14 of the socket portion 6*b*. The spring tongue 12 extends into this recessed area 14, and is resiliently or flexibly bendable in the radial direction, i.e. toward the longitudinal axis A. The polymeric material of the socket portion 6*b* hereby enables a deflection of the spring tongue 12 in this direction, and preferably has a corresponding spring counter effect in order to return the spring tongue 12 upwardly in the radial direction. Pursuant to FIG. 1, the spring tongue 12 can have a thickened portion in the radial direction, i.e. a greater wall thickness than the remaining parts of the socket portion 6*b*. By inserting the plate spring 8 into the intermediate space 10*a*, the plate spring 8 presses against the thickened end of the spring tongue 12, so that the spring tongue is pressed in the radial direction into the inner space 4, and thus narrows the inner space 4 in this region. In this connection, the plate spring 8 preferably rests loosely against the spring tongue 12. FIG. 1 already shows the inserted state of the plate spring 8, by means of which the spring tongue 12 is thus displaced inwardly into the inner space 4.

By means of the subsequent insertion of a headrest rod 5, for example in FIG. 1 from below, the spring tongue 12 is thereby again pressed radially outwardly against the spring effect of the plate spring 8. The spring plate 8 thus forms the elastic clamping effect for accommodating the headrest rod 5 in the inner space 4 by pressing the spring tongue 12 against the headrest rod 5.

The plate spring 8 is formed as a sheet-metal strip of sheet steel. Pursuant to FIG. 8*b*), the plate spring 8 can, for example, be essentially flat, i.e. pursuant to FIG. 8*b*) the plate spring 8 is placed upon the cylindrical outer periphery of the socket portion 6*b*, so that its curvature is determined by the socket portion 6*b*. Pursuant to FIG. 8*a*), the plate spring 8 has a greater curvature in the transverse direction, as a result of which a greater rigidity of the spring can be provided. The shape or character of the curvature can vary along the longitudinal direction, for example continuously between the configurations of FIGS. 8*a*) and 8*b*).

The spring effect of the plate spring 8 is thus essentially ensured by its free end 8*a*, whereby its central portion 8*b* is fixed by the catching portion 10 of the socket body 6. In principle, the other free end 8*c* could also be provided with a similar spring effect to that of the free end 8*a*, for which purpose accordingly a further spring tongue 12 would be provided spaced from the illustrated spring tongue in the longitudinal or axial direction, and with a corresponding provision of a further recessed area 14.

Pursuant to FIG. 1, the plate spring 8 can be embodied merely as an essentially rectangular sheet-metal strip. The width "b", the length "l", and the thickness "d" of the plate spring 8 can be freely selected; in conformity therewith, merely the catching portion 10 or intermediate space 10*a* has to have a suitable configuration in order to accommodate the respective plate spring 8.

The plate spring 8 can be unwound from a continuous piece of material, for example directly from a coil, and can be configured to the suitable dimensions, for example by stamping.

The spring strength can thus be suitably set already by the various parameters b, l, d, and possibly by the selection of the material and the curvature in the transverse direction according to FIG. 8a). Furthermore, the distance in the longitudinal direction between the spring tongue 12 and the catching portion 10 for forming the resilient region, of the free end 8a can also be suitably selected.

Figure 2A:
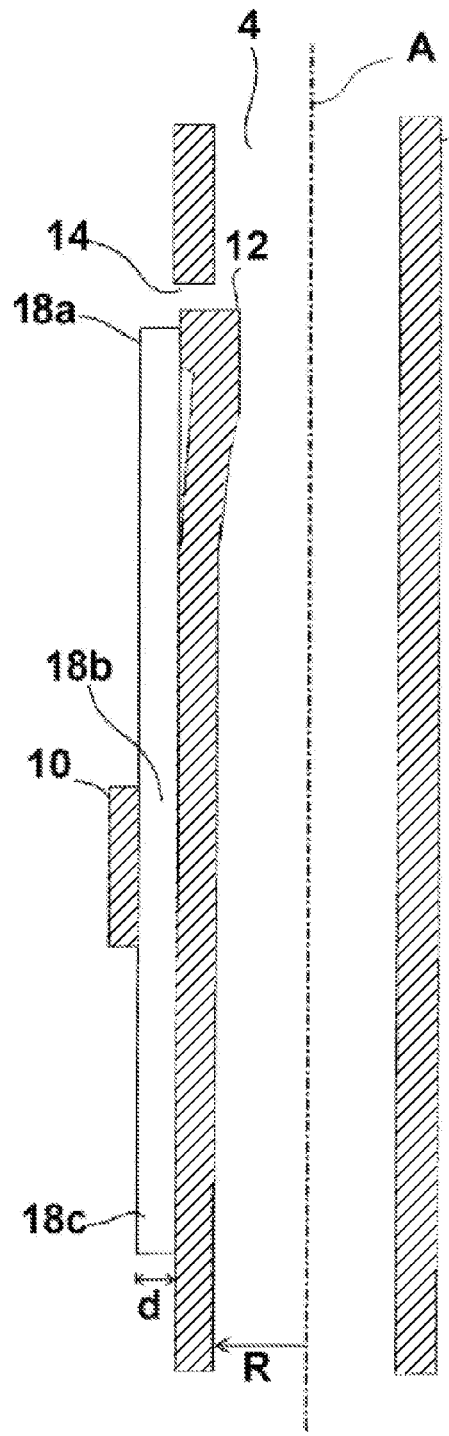
FIGS. 2a & 2b show a longitudinal section and a side view of a further exemplary embodiment having a plate spring with contouring for altering the spring rigidity.
Figure 2B:
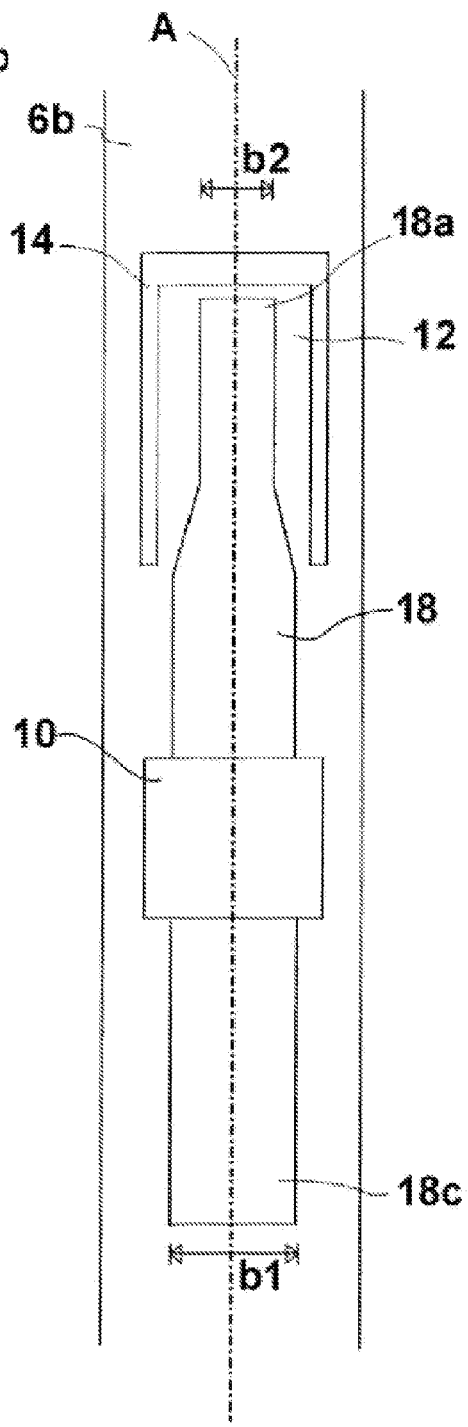

Pursuant to the embodiment of FIG. 2, the sheet metal or plate spring 18 is configured not with merely a rectangular basic shape, but with a suitable geometry or contouring along its longitudinal axis A. For example, its width "b" has a variable configuration, and here varies between a value b1 at one end and a value b2 at the other end, for example as shown with a transition region that changes continuously in a trapezoidal manner. In contrast to the configuration of FIG. 1, in this embodiment the geometry of the free end 18a is considerably different, whereby this end can, for example, be narrowed or have a smaller width b2. Thus, without changing the configuration of the hook or catching portion 10, and having the same length, the spring strength can already be varied by means of the contouring,. The trapezoidal transition region can also be suitably selected in order to suitably choose the spring strength of the plate spring or the spring characteristic for providing the resilient force upon the spring tongue 12.

Figure 3A:
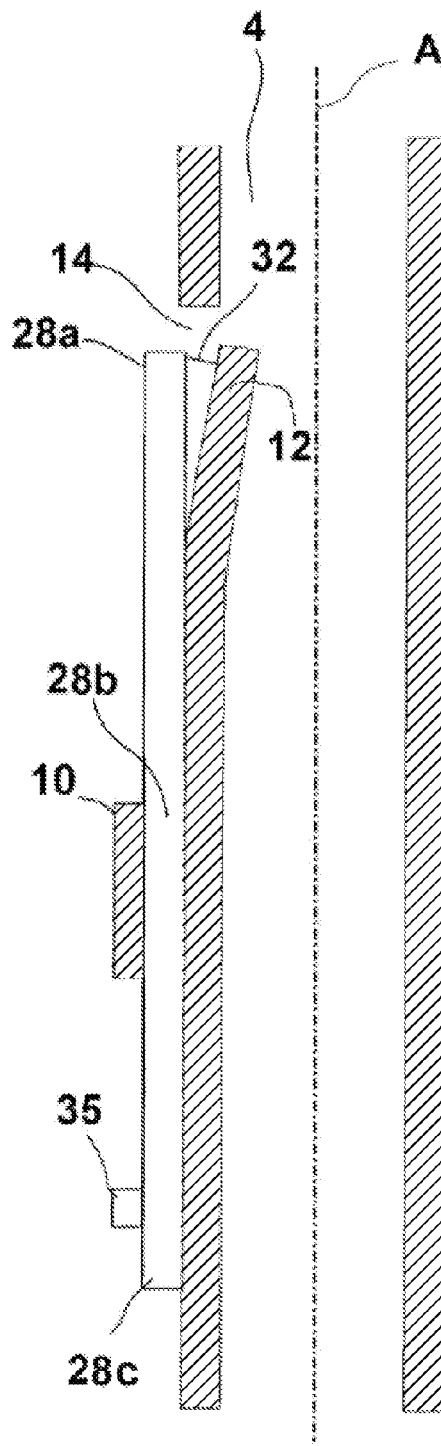
FIGS. 3a & 3b show a longitudinal section and a side view of a further exemplary embodiment with a plate spring having release means for the securement.
Figure 3B:
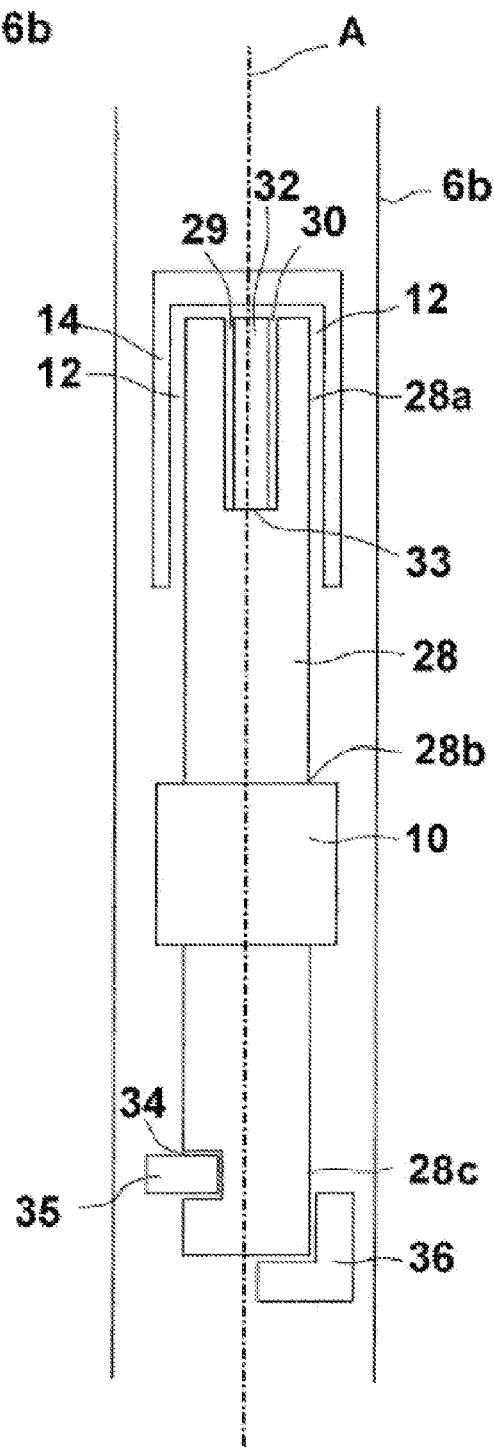

Pursuant to FIG. 3, the free end 28a of the sheet metal or plate spring 28 is continuously structured, whereby recessed areas 29, 30, which extend in the longitudinal direction, extend out in the longitudinal direction from the end 28a of the plate spring 28, so that a central spring region 32 is formed in the free end 28a of the plate spring 28; the central spring region 32 thus forms a spring within the spring. In this connection, pursuant to the sectional illustration the spring region 32 can be bent inwardly in the radial direction, for example can be bent along a crease line 33. Appropriate crease or bend lines can be suitable, and can be formed with suitable bend angles, whereby the width and length of the recessed areas 29, 30 can also be suitably selected. In principle, the spring region 32 can also be bent in its longitudinal direction. The spring region 32 then rests against the spring tongue 12, whereby the total spring effect is thus formed from the plate spring 28, i.e. its free end 28a, and the spring effect of the spring region 32, so that two different spring characteristics can be superimposed.

As furthermore shown in FIG. 3, and pursuant to the present invention also possible with the other exemplary embodiments, a fixation of the plate spring 28 in the longitudinal direction, i.e. the axial direction, can be achieved by an appropriate release means 34 in the plate spring 28, and an interlocking receiving means, for example in the release means 34 by means of an adapting element or abutment member 35, and/or can be achieved by an abutment member 36 at the free end 28c of the plate spring 28. Thus, with little expenditure, a fixation of the plate spring 28 in the longitudinal direction is achieved, whereby the abutment members 35, 36 can, for example, also be monolithically formed with the socket portion 6b, for example directly during production thereof or by subsequent injection or extrusion as polymeric material regions.

Other configurations, abutment members or recessed areas for the fixation or arresting of the plate springs 8, 18 or 28, or with the other embodiments, are also possible.

Figures 4A, 4B:
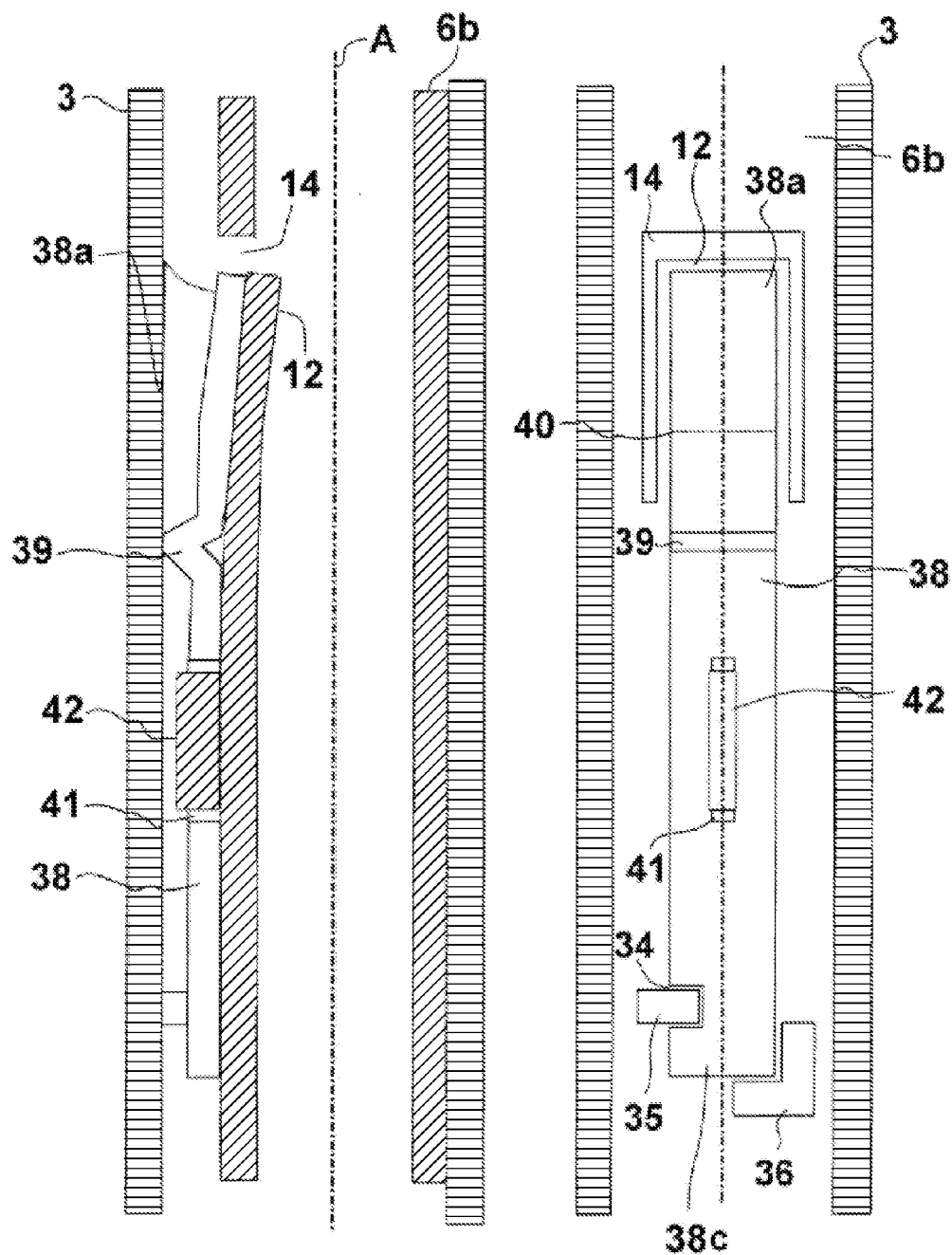
FIGS. 4a & 4b show a longitudinal section and side view of a further exemplary embodiment with deformation of the plate spring along its longitudinal axis.

FIG. 4 shows a preforming of the sheet metal or plate spring 38 along its longitudinal axis A, i.e. a shaping inwardly or outwardly in the radial direction, in other words toward or away from the longitudinal axis A, in order to set desired spring characteristics. By means of the performing, even under limited installation conditions the pretensioning or biasing, and other parameters, can also be flexibly set. For this purpose, pursuant to this embodiment the free end 38a is bent radially inwardly along a crease line 40 in order to provide a greater pretensioning.

Furthermore shown pursuant to FIG. 4 is a pleat 39 or a bead or corrugation, which extends along the width of the plate spring 38. Pursuant to such a configuration, the plate spring 38 itself can be supported against the outer receiving means 3 of the headrest socket 2. Thus, upon insertion, the plate spring 38 is only prefixed on the socket body 6 or its socket portion 6b; the actual support of the plate spring 38 is effected after mounting of the headrest socket 2 or its socket portion 6b into the receiving means 3. In particular in contrast to the configuration of a spring as a linear filament, this has the advantage that a space consuming or space limiting receiving means on the headrest socket 2 for the mounting of the spring is no longer required, since the plate spring 38 itself can be supported on the receiving means 3.

Thus, pursuant to the present invention the receiving means 3 can be kept simple and straightforward, for example being formed directly in the rest structure without mounting additional tubular portions in the rest structure for this purpose.

Furthermore shown in FIG. 4 is a fixation by means of a central recessed area 41 in the plate spring 38, into which a projection 42 of the socket portion 6b, which extends radially outwardly, extends and fixes the plate spring 38 not only in the transverse direction, i.e. along the width "b" thereof, but also in the longitudinal direction.

Figure 5A:
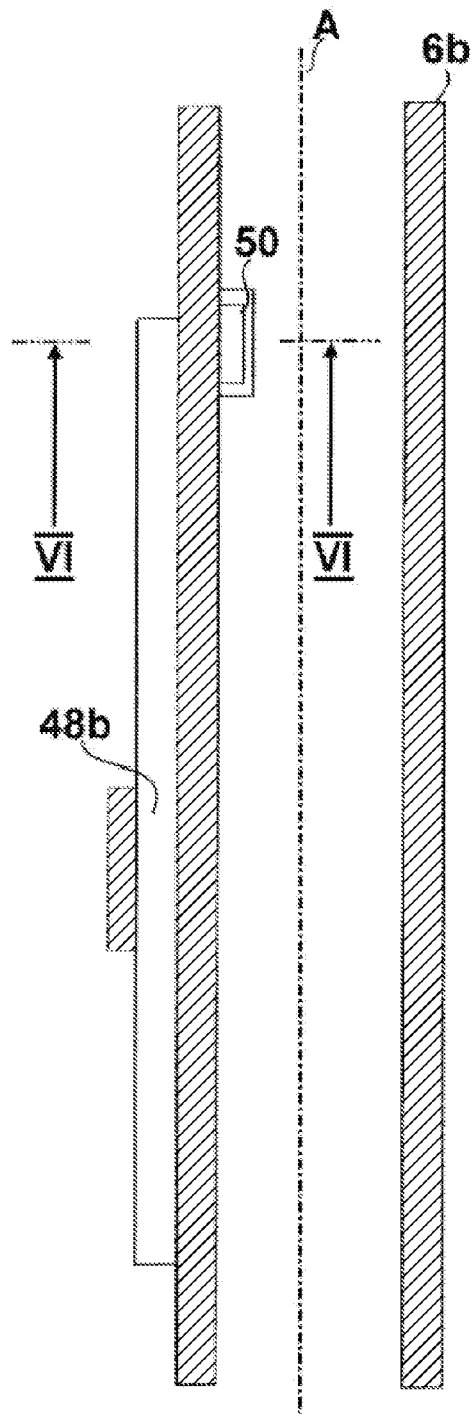
FIGS. 5a & 5b show a longitudinal section and side view of a further exemplary embodiment for exerting torques about the longitudinal axis of the headrest socket.
Figure 5B:
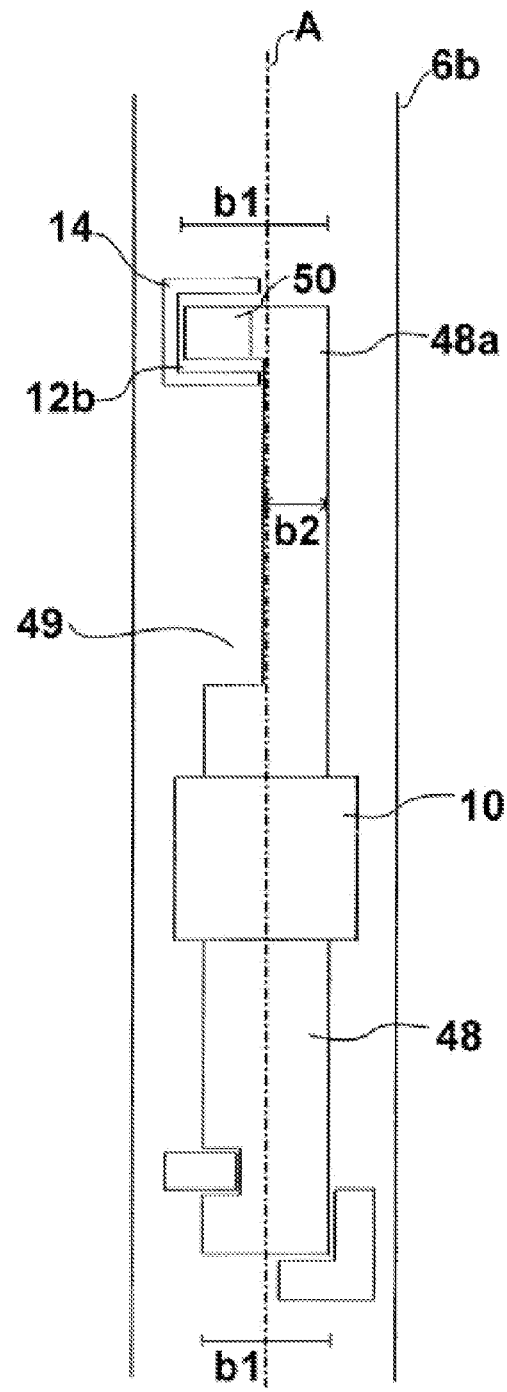
Figure 6:
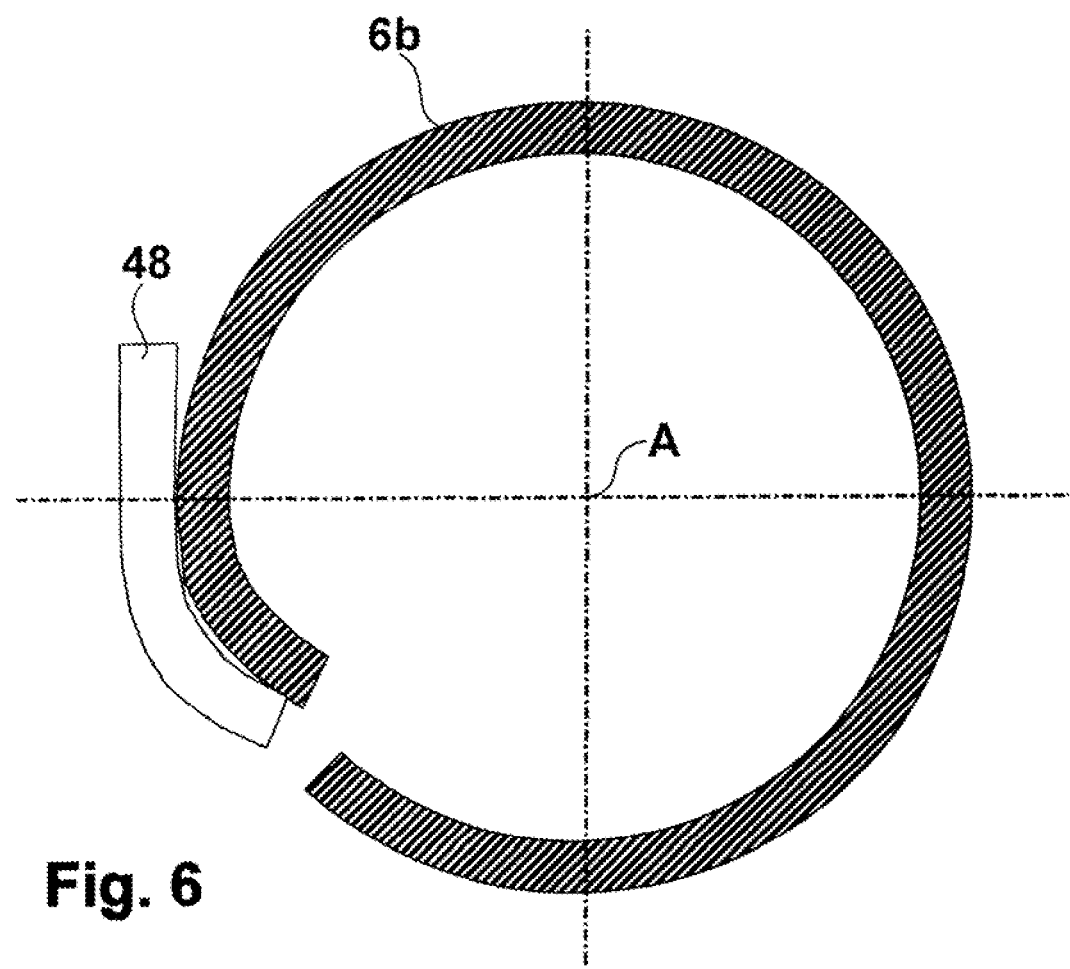
FIG. 6 is a cross-sectional view taken along the line VI-VI in FIG. 5.

FIGS. 5 and 6 show an embodiment of a sheet metal or plate spring 48 for providing torque or tortional moments about the longitudinal axis A of the socket portion 6b or of the socket body 6. For this purpose, the plate spring 48, at its free end 48a, is provided with a structuring that is asymmetrical relative to its longitudinal direction. Here, the structuring includes a recessed area 49, which occupies approximately half of the width b1 of the plate spring 48 and thus correspondingly asymmetrically, i.e. from one side, reduces the width of the plate spring to b2 <b1, whereby at the free end 48a again a greater width, for example again b1, is provided, so that a spring portion 50, which extends in the transverse direction, exerts a spring effect. In conformity therewith, here the recessed area 14 is not provided in the longitudinal direction, but rather in the transverse or circumferential direction of the socket portion 6b, and also the spring tongue 12b is correspondingly formed in the transverse or circumferential direction, for example with a link or joint portion that extends in the longitudinal direction or the axial direction A. By means of the configuration of such a spring effect of the spring tongue 12b, together with the securing of the central portion 48b of the plate spring 48 below the catching portion 10, there is thus produced a combination of bending along the longitudinal axis A and a torsion or twisting about the longitudinal axis A of the socket portion 6b, thus resulting in a torque. Such a configuration can be advantageous with respect to the required position of the spring tongue 12, especially if due to manufacturing conditions, the spring tongue 12 is not or cannot be provided in the same longitudinal axis A as the catching portion 10 that serves for the securement.

With the embodiments of FIGS. 9 to 12, the socket portion 6b is provided with two spring tongues 112, around each of which extends a recessed area 14 of the socket portion 6b, i.e. of the wall 6b1 (see FIG. 10) of the socket portion 6b. Thus, the respective spring tongue 112 extends into the respective recessed area 14, and is resiliently or flexibly bendable in the radial direction, i.e. perpendicular to the longitudinal axis A. Formed at the end of the spring tongue 112 is an abutment or contact portion 112a that extends radially inwardly;

this contact portion 112a can, for example, be an inwardly extending curvature.

Injected or extruded in the wall 6b1 of the socket portion 6b are two sheet metal or plate springs 108 of sheet steel; the plate springs determine the spring force of the spring tongues. The four edges 108a, and the respective underside 108b, of the plate springs 108 rest against the polymeric material of the socket portion 6b, so that they are largely surrounded by the polymeric material, and are exposed only at their outer surfaces 108c. This ensures a positive connection and an accommodation whereby the plate springs 108 will not fall out; furthermore, a positive material connection, i.e. an adhesion effect at the polymeric material, is preferably present. The plate springs 108 can also be injected or extruded entirely in the material of the socket, i.e. can be accommodated in the wall 6b1.

The plate springs 108 provide a local reinforcement of the socket portion 6b. They extend partially into the spring tongues 112 and therefore determine the spring rigidity of the spring tongues.

Figure 9:
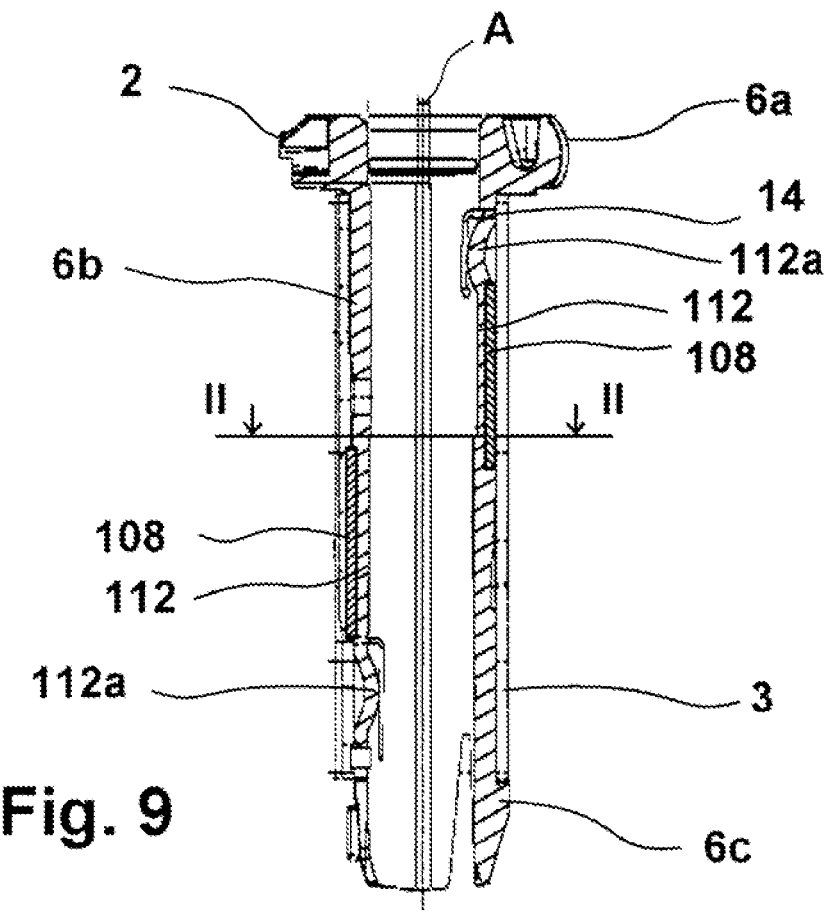
FIG. 9 is a longitudinal section of a headrest socket pursuant to a further exemplary embodiment.
Figure 10:
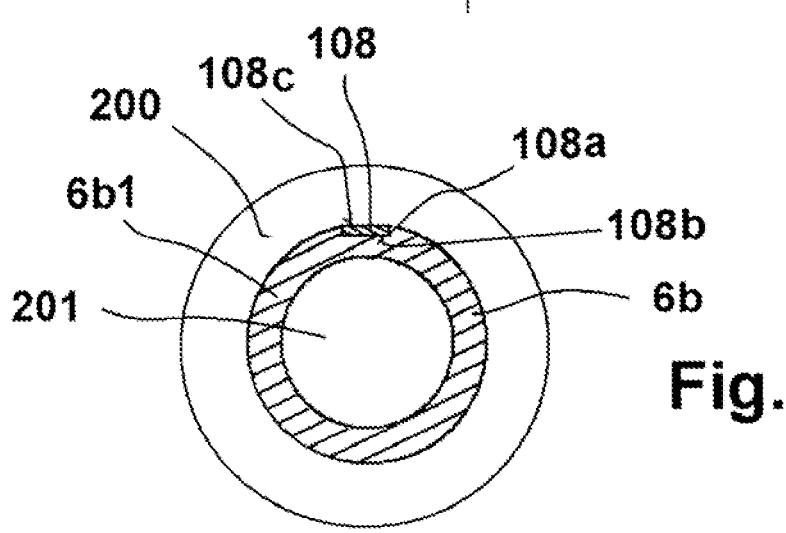
FIG. 10: is a cross-section taken along the line II-II in FIG. 9.
Figure 11:
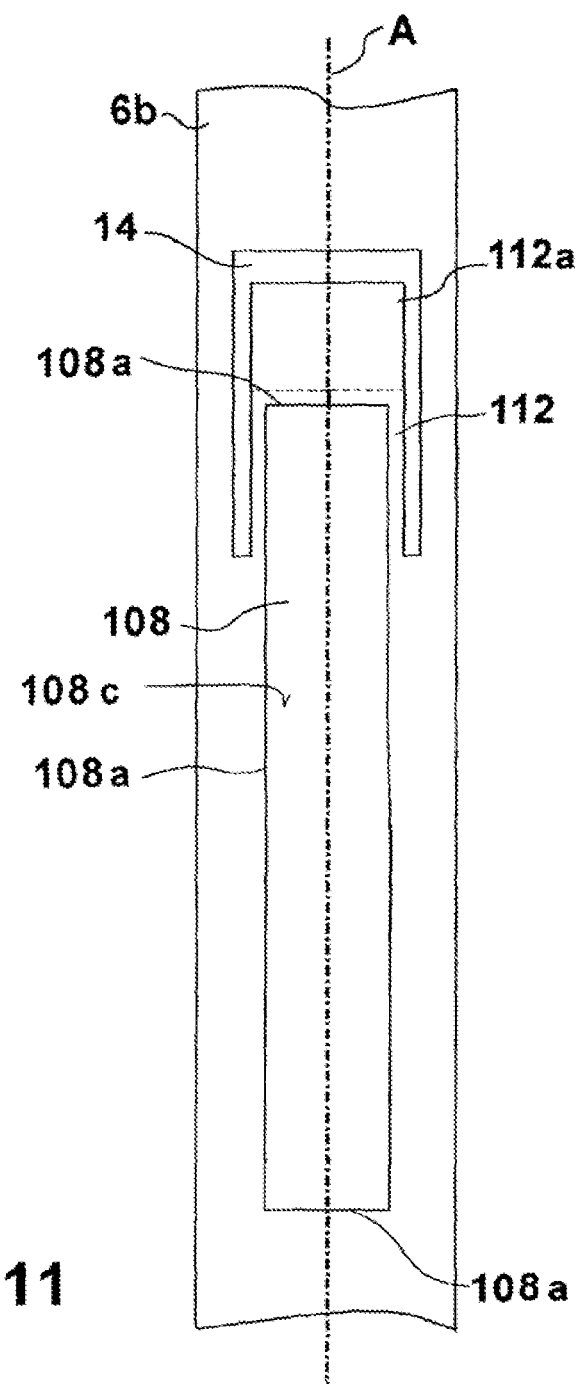
FIG. 11 is a side view of the socket portion taken in the direction of the plate spring in FIGS. 9 and 10.

By means of the subsequent insertion of a headrest rod 5 from above in FIG. 9, the spring tongues 112, i.e. in particular their contact portions 112a, are thus pressed radially outwardly against the spring effect of the plate springs 108. The plate springs 108 thus provide the resilient clamping effect for accommodating the headrest rod 5 in the inner space 4 by pressing the spring tongues 112 against the headrest rod 5.

The plate spring 108 is formed as a sheet metal strip of sheet steel. Pursuant to FIG. 10, the plate spring 108 can preferably be essentially planar and rectangular, or, to vary its spring characteristics, can also be structured pursuant to the previously described embodiments of FIGS. 1 to 6 and 8. Thus, also with this embodiment the plate spring 108 can be made from a continuous product, for example can be unwound directly from a coil and can be configured to a suitable dimension, for example by stamping.

Figure 12:
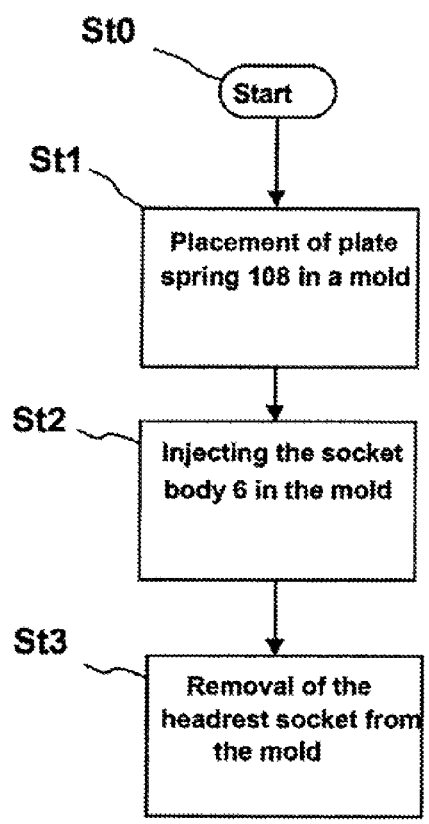
FIG. 12 is a flow diagram of the manufacturing process of the exemplary embodiment of FIGS. 9 to 11.

As shown in FIG. 12, the manufacturer of the headrest socket 2 includes the following steps:

Start at step ST0, possibly cutting the plate springs out of the starting material, such as from a coil, step St1—placing the plate springs 108 into a mold, step St2—injecting or casting the socket body 6 in one or two molds accompanied by the accommodation of the plate springs 108 in the socket body, step St3—removal of the headrest socket from the mold or molds, possible finishing work.

It should be understood that pursuant to the present invention, the configurations of all of the exemplary embodiments can be combined with one another in any desirable manner.

The specification incorporates by reference the disclosure of German priority document 10 2010 010 978.9 filed Mar. 10, 2010.

The present invention is, of course, in no way restricted to the specific disclosure of the specification and drawings, but also encompasses any modifications within the scope of the appended claims.

What we claim is:

1. A headrest socket for accommodating a headrest rod, comprising:

a socket body of polymeric material, wherein said socket body has an inner space for accommodating a headrest rod;

a spring tongue provided as part of said socket body, or monolithically formed on said socket body, wherein said spring tongue is displaceable in a direction toward said inner space of said socket body for exerting a clamping effect;

a spring device disposed on said socket body for applying a tensioning or pressure action upon said spring tongue, wherein said spring device is configured as a plate spring fashioned from a sheet metal strip, further wherein said plate spring rests upon an outer surface of said socket body, and wherein said plate spring has a deflectable section that rests upon said spring tongue; and a catching portion that is monolithically formed with said socket body or as part of said socket body, wherein said plate spring is received in an intermediate space between said catching portion and the outer surface of said socket body, further wherein said plate spring has a first free end that rests upon said spring tongue for ensuring a spring effect, a central portion, and a second free end that rests upon the outer surface of said socket body, and wherein said central portion of said plate spring is clamped or fixed in between said catching portion and the outer surface of said socket body to secure said plate spring in the radial direction or in the transverse direction, wherein said plate spring is configured as an elongated sheet steel strip that extends parallel to a longitudinal axis or said socket body, wherein said first free end and said second free end of said plate spring extend in opposite directions from the central portion.

2. A headrest socket according to claim 1, wherein said plate spring has a width that is greater than a thickness of said plate spring measured between an upper side of said plate spring, and a lower side of said plate spring that rests on said socket body.

3. A headrest socket according to claim 2, wherein said width of said plate spring varies along a longitudinal dimension of said plate spring.

4. A headrest socket according to claim 3, wherein said plate spring has a first end that exerts a spring effect upon said spring tongue, and wherein said first end is structured and/or has a width that is less than a width of an opposite, second end of said plate spring.

5. A headrest socket according to claim 4, wherein said first end of said plate spring that exerts the spring effect is provided with a separate spring portion that is displaceable relative to other portions of said plate spring and to provide a non-linear spring characteristic or torque.

6. A headrest socket according to claim 5, wherein at least one recessed area is formed on said first end of said plate spring that exerts the spring effect in order to form said spring portion with a smaller width.

7. A headrest socket according to claim 2, which includes two spring tongues, which are spaced apart as viewed in the axial direction, and two plate springs, wherein each of said spring tongues has associated with it one of said plate springs for applying the tensioning or pressure force.

8. A headrest socket according to claim 2, wherein said plate spring is deformed to form a spring portion that is angled or bent off in a direction toward the longitudinal axis of said socket body.

9. A headrest socket according to claim 2, wherein said plate spring is provided with recessed areas, apertures or release means engaged by a shaped piece or shaped region of said socket body to effect fixation of said plate spring in a longitudinal and/or transverse direction.

10. A headrest socket according to claim 2, wherein said plate spring provides torque about its longitudinal axis or relative to the longitudinal axis of said socket body, and wherein said plate spring rests against said spring tongue in a manner that is non symmetrical relative to a transverse direction or width of said plate spring.

11. A headrest socket according to claim 10, wherein said spring tongue has a non symmetrical configuration relative to the longitudinal axis of said socket body and has a link region that extends in the longitudinal direction.

12. A headrest socket according to claim 2, wherein said plate spring has a fold region or a pleat for abutment of said plate spring against both an outer receiving means of a backrest as well as against said socket body.

13. A headrest socket according to claim 2, wherein said plate spring is injected or fused in a wall of said socket body.

14. A headrest socket according to claim 13, wherein a form locking or positive material connection is formed between said plate spring and polymeric material that forms said socket body.

15. A headrest socket according to claim 13, wherein an inner side of said plate spring, and at least three edges of said plate spring, have polymeric material of said socket body extend about them, and wherein an outer side of said plate spring is exposed toward the outside or has the polymeric material of said socket body extend about it.

\* \* \* \* \*